March 21, 1950     L. A. MARANTZ     2,501,183
CLUTCH AND BRAKE MECHANISM FOR SEWING MACHINES
Filed Dec. 28, 1946     2 Sheets-Sheet 1
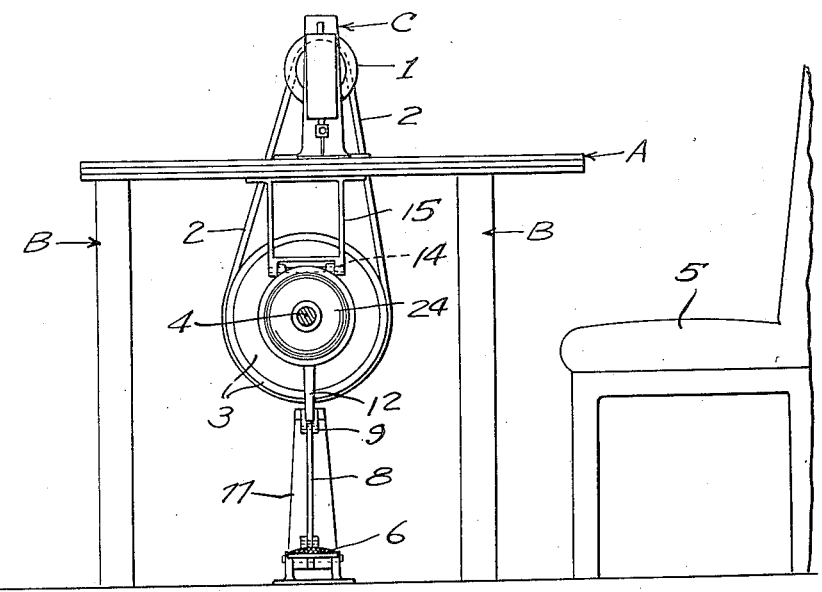
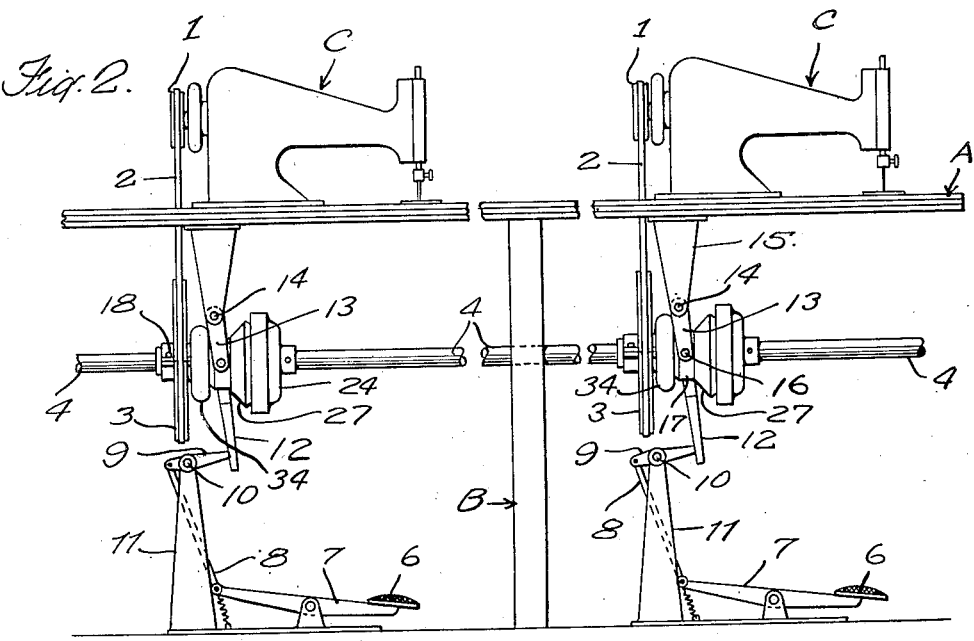
Inventor
LEON ALBERT MARANTZ
By Frederic P. Warfield
Attorney March 21, 1950 L. A. MARANTZ 2,501,183
CLUTCH AND BRAKE MECHANISM FOR SEWING MACHINES
Filed Dec. 28, 1946 2 Sheets-Sheet 2
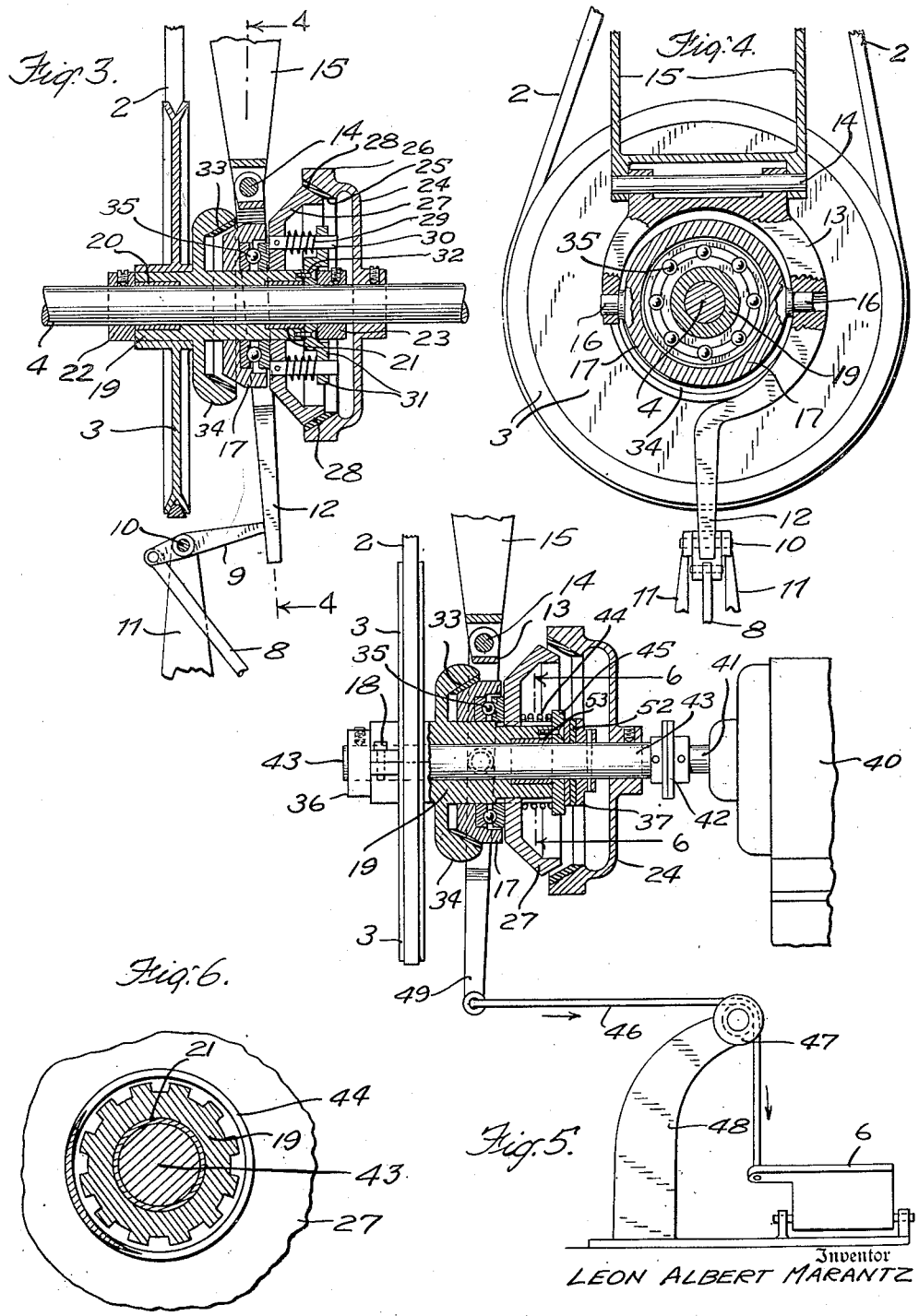
Inventor
LEON ALBERT MARANTZ
By Frederic P. Coffin
Attorney Patented Mar. 21, 1950

2,501,183

UNITED STATES PATENT OFFICE 2,501,183

CLUTCH AND BRAKE MECHANISM FOR SEWING MACHINES

Leon Albert Marantz, East Orange, N. J., assignor to U. S. Safety Table Corp., Hillside, N. J., a corporation of New Jersey Application December 28, 1946, Serial No. 719,070

7 Claims. (Cl. 192—18)

This invention relates to a clutch mechanism for transmitting power from a driven shaft to machines operated therefrom.

The invention has special advantages when applied for transmitting power from a driven line shaft to a series of machines, as sewing machines, adapted to be operated therefrom, whereby each individual sewing machine may be driven from the line shaft or disconnected therefrom by the individual operator without effecting the operation of any of the other machines on the line.

The invention also presents certain advantages where a single machine, as a sewing machine, is to be connected and disconnected at will from a motor driven shaft.

An object of the present invention is to provide a transmission apparatus of the character described in which a driving pulley, by which the machine is driven, is free to rotate upon the driven shaft but is fixed as against lateral movement, and may, at the will of the operator, be connected to rotate with the driven shaft by a clutch and brake mechanism located on one side of the driving pulley and extending along the driven shaft from said driving pulley.

A further object of the invention is to provide a device of the character described which is compact, certain in operation, and which in use will continuously transmit its full normal power to the machine operated from the driven shaft.

A further object is to provide a device of the character described which because of its simplicity may be constructed at relatively low cost and of relatively light weight, while at the same time delivering its full rated power.

Other objects of the invention will in part be obvious and will in part appear hereinafter.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention reference should be had to the following detailed description taken in connection with the accompanying drawing, in which:

Fig. 1 is a view from one end of a sewing machine bench showing a single machine, the power shaft in section, with the position of the operator indicated by the operator's chair;

Fig. 2 is a rear view of a sewing machine bench carrying two machines each machine being driven from a line shaft by a driving pulley which may be connected to the line shaft and disconnected therefrom by the action of the foot treadle shown;

Fig. 3 is a longitudinal sectional view showing the clutch mechanism of the invention as it is mounted upon the line shaft of Fig. 2;

Fig. 4 is a section taken on the line 4—4 of Fig. 3 looking in the direction of the arrow;

Fig. 5 is a view of a modified form showing certain modifications in the mounting and operation of the moving members of the clutch mechanism and also indicating a motor drive for the shaft. This figure also shows a modification in the connection between the operator's foot treadle and the moving parts of the clutch mechanism operated by the action of said treadle; and Fig. 6 is a section on the line 6—6 of Fig. 5 looking in the direction of the arrows.

As shown in Figs. 1 and 2, A represents a sewing machine table top carried by legs B and carrying a sewing machine C of any desired construction, having an operating pulley 1 driven by a belt 2 from a driving pulley 3 mounted upon the line shaft 4 driven from any suitable source of power. An operator's chair is indicated at 5 and the operator's foot treadle 6 is carried at one end of a lever 7 pivoted at its other end to the connecting link 8, which is pivotally connected at its upper end to the pivoted operating link 9 pivoted at 10 on a floor upright 11 and bearing at its inner end against arm 12, carried down from the clevis 13, which is pivotally mounted upon the rod 14 carried at the lower end of support 15. This clevis is pierced for the reception of studs 16 carried by the member 17 which constitutes the moving member of the clutch mechanism as will presently be described.

Turning now to the detail of the clutch mechanism as shown in Figs. 3 and 4, the driving pulley 3, is preferably, for purposes of installation and repair, a split pulley having its two split members connected by the screws 18. This pulley is carried upon the sleeve 19 extending longitudinally along the line shaft 4 and having oilless bearings 20 and 21 at its two ends. This sleeve is held in fixed position longitudinally of said line shaft by the collars 22 and 23 held to the line shaft by screws. One or both of these collars may be of oilless bearing material. Spaced along the shaft from the driving pulley 3 is a clutch member 24 shown as pinned to the shaft 4 and provided with a clutch surface 25 preferably faced with frictional material 26, such as cork, leather, asbestos or other frictional facing.

The various other clutch and brake elements which make up the mechanism are located along the shaft 4 between the pulley 3 and the fixed clutch member. These members comprise a second clutch member 27 having a clutch surface 28 cooperating with the frictional facing 26. This second clutch member is mounted to slide longitudinally of the sleeve 19 and spiral springs 29 surrounding studs 30 projecting from the clutch member 27 normally carry the two clutch surfaces out of engagement. Studs 30 pass through openings toward the outer periphery of sleeve 31 which is connected as by screws 32 to the sleeve 19 for rotation therewith.

The moving member 17 is mounted for movement longitudinally of the sleeve 19 and at one limit of its movement it engages the frictional facing 33 upon brake disk 34 carried by sleeve 19. The action of the springs 29 normally carries the braking surface of member 17 into engagement with the braking surface carried with the pulley 3. Upon movement by the operator of the treadle the moving member 17 by clevis connection as already described will be carried to the right as shown in Fig. 3, the pulley brake will be relieved and the clutch member 27 moved to the right against the force of the springs 29 into engagement with the fixed clutch member 24.

The clutching position is shown in Fig. 3 and the braking position in the modified form in Fig. 5. In the construction shown in Fig. 3 as well as in Fig. 5, anti-friction thrust bearings, indicated generally by the reference character 35, are interposed between the member 17 and the movable one of the two clutch members. Movement along shaft 43 of sleeve 19 and the pulley 3 carried thereby is prevented by the two collars 36 and 37 at each end of the sleeve.

As shown in Figs. 5 and 6 a single spiral spring 44 carries the clutch member 27 to the left out of engagement with the fixed clutch member 24. In this instance clutch member 27 is splined to the sleeve 19 so that it can move therealong but rotates therewith. This spiral spring is held to position by the retaining collar 45 screwed to the end of member 19. Motor 40 is diagrammatically indicated in Fig. 5 and its shaft 41 is shown connected as at 42 for driving the shaft 43.

Fig. 5 shows also a connection from the driving treadle consisting of connecting cable 46 passing around the pulley 47 carried by support 48 and connected at its other end to arm 49 connected to clevis 13 which, as before, is pinned to member 17 which by the operation of the treadle is carried to the right carrying with it clutch member 27 against the force of spring 44 and connecting the driving pulley to rotate with the shaft. In this case the driving pulley is held against movement longitudinally of the driving shaft 43 by the collars 36 and 37 secured to shaft 43. Between the collar 37 and collar 45 screwed to the end of the sleeve 19 an oilless bearing 52 may be interposed. Fig. 5 also shows oilless type bearing 53 at one end of the sleeve 19 and a similar oilless bearing may be supplied for the other end of the sleeve.

Otherwise the parts shown in Fig. 5 are the same as those shown in Figs. 3 and 4 and carry the same reference characters.

The operation of the clutch mechanism will now be clear. When the operator wishes to use his sewing machine his foot upon the treadle, whether in the mechanism of Fig. 3 or Fig. 5, carries the clevis 13 to the right and with it the member 17 which carries the movable clutch member into engagement with the fixed clutch member against the force of the spring pressure thereon and the rotation of the driven shaft is then transmitted to the pulley 3 through the two clutch members and the sleeve 19 with which the pulley 3 is carried. When the operator removes his foot from the treadle the spring pressure carries the clutch members out of engagement and the member 17 is carried into contact with the braking surface 33 and the rotation of the pulley thus quickly stopped.

The operation of the modification shown in Fig. 5 is the same save that there is only one spring and the sleeve 19 is caused to rotate with the clutch member 27 by the spline connection therebetween.

It will thus be seen that this invention presents a combination in which the driving pulley does not move longitudinally with relation to the driving shaft so that the connection of said driving pulley to the machine operated thereby continues in line and there is no stretching, or slipping of the driving belt or otherwise tending to cause loss of power and tending to cause the parts to break down in use and shorten the life of the device as a whole.

This is an important advantage in that the belt used on the apparatus for connection to the machine to be driven on the bench does not get stretched, does not fly off, and V-belts may be employed for greater efficiency since the pulley stays in line with the pulley on bench machine.

It will also be clear that the clutch mechanism as shown may be placed at any desired point along the line shaft and is not restricted to a position dependent upon the location of the leg of the bench.

The drawings show operator's control by a foot treadle. This, however, may be replaced by any desired form of operator's control, such as for example, a lever to be moved by the knee of the operator, or a button in position near the hand of the operator controlling the clutch mechanism by electric or other means.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In a device of the class described, a driven shaft, a sleeve mounted for rotation thereon but fixed against longitudinal movement therealong, a pulley carried by said sleeve for rotation therewith, a clutch member fixed to said shaft for rotation therewith, a second clutch member adapted to cooperate with said fixed clutch member, said second clutch member being mounted for movement longitudinally of said sleeve but connected to said sleeve for rotation therewith, a member movable along said sleeve and carrying in its travel in one direction said movable clutch member into engagement with the fixed clutch member, a braking surface on said movable member adapted to cooperate with a braking surface carried by said sleeve, spring means adapted normally to carry said movable clutch member away from the fixed clutch member, and the braking surface of the movable member into contact with the braking surface of said sleeve, and means under the control of the operator for carrying said movable member against the force of said spring tension and the movable clutch member therewith into contact with the fixed clutch member whereby said pulley will be rotated with said shaft.

2. In a device of the class described, a driven shaft, a sleeve mounted for rotation thereon but fixed against longitudinal movement therealong, a pulley carried by said sleeve for rotation therewith, a clutch member fixed to said shaft for rotation therewith, a second clutch member adapted to cooperate with said fixed clutch member, said second clutch member being mounted upon said sleeve between said pulley and said fixed clutch member for movement longitudinally of said sleeve but connected to said sleeve for rotation therewith, a member movable along said sleeve and carrying in its travel in one direction said movable clutch member into engagement with the fixed clutch member, a braking surface on said movable member adapted to cooperate with a braking surface carried by said sleeve, spring means adapted normally to carry said movable clutch member away from the fixed clutch member, and the braking surface of the movable member into contact with the braking surface of said sleeve, and means under the control of the operator for carrying said movable member against the force of said spring tension, and the movable clutch member therewith, into contact with the fixed clutch member whereby said pulley will be rotated with said shaft.

3. In a device of the class described, a driven shaft, a sleeve mounted for rotation thereon but fixed against longitudinal movement therealong, a pulley carried by said sleeve for rotation therewith, a clutch member fixed to said shaft for rotation therewith, a second clutch member adapted to cooperate with said fixed clutch member, said second clutch member being mounted upon said sleeve, for movement longitudinally of said sleeve but connected to said sleeve for rotation therewith, spring means adapted normally to carry said movable clutch member away from the fixed clutch member and means under the control of the operator for carrying said movable clutch member against the force of said spring tension into contact with the fixed clutch member.

4. In a device of the class described, a driven shaft, a sleeve mounted for rotation thereon but fixed against longitudinal movement therealong, a pulley carried by said sleeve for rotation therewith, a clutch member fixed to said shaft for rotation therewith, a second clutch member adapted to cooperate with said fixed clutch member, said second clutch member being mounted upon said sleeve between said pulley and said fixed clutch member for movement longitudinally of said sleeve, but connected to said sleeve for rotation therewith, a power and brake engagement member mounted for longitudinal movement along said sleeve, but fixed against rotation, this member acting as a brake upon the pulley when the machine is at rest, spring means adapted normally to carry said member from its power position to its brake position and means, under the control of the operator, for moving said member against the force of said spring means to its power position.

5. In a device of the class described, a driven shaft, a pulley rotatable thereon but fixed against longitudinal movement therealong, a clutch member carried by said shaft for rotation therewith, a brake surface carried with said pulley, a second clutch member carried on said shaft for longitudinal movement thereon between said pulley and said clutch member fixed to said shaft, a driving connection between said second clutch member and said pulley, a brake surface, for cooperation with the brake surface carried with said pulley, mounted on said shaft for longitudinal movement thereon, a spring acting to carry said clutch members out of contact and said brake surfaces into contact, and means, under the control of the operator, for operating said movable clutch member against the force of said spring, for release of the brake members, and rotation of said driving pulley.

6. In a device of the class described, a driven shaft, a pulley rotatable thereon but fixed against longitudinal movement therealong, a clutch member carried by said shaft for rotation therewith, a brake surface carried with said pulley, a second clutch member carried on said shaft for longitudinal movement thereon between said pulley and said clutch member fixed to said shaft, a driving connection between said second clutch member and said pulley, a brake surface, for cooperation with the brake surface carried with said pulley, mounted on said shaft for longitudinal movement thereon, a spring acting to carry said clutch members out of contact and said brake surfaces into contact, and means, under the control of the operator, for operating said movable clutch member against the force of said spring, for release of the brake members, and rotation of said driving pulley, said driven shaft carrying a plurality of said clutch and brake devices each adapted to be operated independently of the other or others.

7. In a device of the class described, a driven shaft, a split pulley rotatable thereon but fixed against longitudinal movement therealong, a clutch member carried by said shaft for rotation therewith, a brake surface carried with said pulley, a second clutch member carried on said shaft for longitudinal movement thereon between said pulley and said clutch member fixed to said shaft, a driving connection between said second clutch member and said pulley, a brake surface, for cooperation with the brake surface carried with said pulley, mounted on said shaft for longitudinal movement thereon, a spring acting to carry said clutch members out of contact and said brake surfaces into contact, and means, under the control of the operator, for operating said movable clutch member against the force of said spring, for release of the brake members, and rotation of said driving pulley.

LEON ALBERT MARANTZ.

REFERENCES CITED

The following references are of record in the file of this patent:

UNITED STATES PATENTS

| Number | Name | Date |
|---|---|---|
| 1,285,663 | Fouse | Nov. 26, 1918 |
| 1,392,403 | Crogan | Oct. 4, 1921 |
| 1,444,573 | Voigt | Feb. 6, 1923 |
| 1,525,965 | Thomas | Feb. 10, 1925 |